US012050427B2

(12) United States Patent
Sunamura

(10) Patent No.: US 12,050,427 B2
(45) Date of Patent: Jul. 30, 2024

(54) IMAGE FORMING APPARATUS

(71) Applicant: CANON KABUSHIKI KAISHA, Tokyo (JP)

(72) Inventor: Kaito Sunamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/080,103

(22) Filed: Dec. 13, 2022

(65) Prior Publication Data

US 2023/0195021 A1 Jun. 22, 2023

(30) Foreign Application Priority Data

Dec. 16, 2021 (JP) ................................ 2021-204608

(51) Int. Cl.
*G03G 15/08* (2006.01)
*G03G 15/00* (2006.01)

(52) U.S. Cl.
CPC ....... *G03G 15/553* (2013.01); *G03G 15/0877* (2013.01)

(58) Field of Classification Search
CPC ............ G03G 15/045; G03G 15/0877; G03G 15/5004; G03G 15/553
USPC ........................................ 399/27, 53, 55, 56
See application file for complete search history.

(56) References Cited

U.S. PATENT DOCUMENTS

| | | | | |
|---|---|---|---|---|
| 9,785,111 | B2 | 10/2017 | Suzuki | |
| 10,036,977 | B2 | 7/2018 | Ono | |
| 10,564,567 | B2 | 2/2020 | Ono | |
| 11,435,675 | B2 * | 9/2022 | Kanai | G03G 15/045 |
| 2020/0310316 | A1 * | 10/2020 | Tomishi | G03G 15/5004 |
| 2020/0409297 | A1 * | 12/2020 | Ikada | G03G 15/5037 |

FOREIGN PATENT DOCUMENTS

| | | | |
|---|---|---|---|
| JP | 2001-075358 | A | 3/2001 |
| JP | 2016-109951 | A | 6/2016 |
| JP | 2017-032745 | A | 2/2017 |
| JP | 2020-020920 | A | 2/2020 |
| JP | 2020-028677 | * | 2/2021 |

* cited by examiner

*Primary Examiner* — Hoan H Tran
(74) *Attorney, Agent, or Firm* — VENABLE LLP

(57) ABSTRACT

An image forming apparatus includes a photosensitive drum, a developing member, an applying device forming a developing potential on the developing member, a driver rotationally driving the developing member, and a controller. The controller selectively executes an operation in first and second modes by controlling a circumferential speed ratio of a circumferential speed of the developing member to a circumferential speed of the drum and a potential difference between a surface potential of the image bearing member in a region where an electrostatic latent image is formed and the developing potential. In the first mode, the ratio is a first ratio of 50% to 100% and the potential difference is a first potential difference, and in the second mode the ratio is a second ratio larger than the first ratio and less than 150% and the potential difference is a second potential difference less than the first potential difference.

12 Claims, 7 Drawing Sheets

IMAGE FORMING APPARATUS

FIELD OF THE INVENTION AND RELATED ART

The present invention relates to an image forming apparatus, such as a laser printer, copy machine, and a facsimile acquiring a recording image by secondary transferring a toner image on a recording material after primary transferring a toner image formed on an image bearing member to an intermediate transfer member with an electrophotographic method.

About an image forming apparatus with an electrophotographic method such as a copy machine, a printer, or a facsimile forming an image on a recording material, a structure which is provided with a developing device visualizing a latent image with a toner is well-known. The developing unit as described above which is provided with a developing roller bearing and feeding a toner and a toner supplying roller are well-known as well. In this developing unit a toner is supplied from the toner supplying roller to the developing roller and the toner supplied is restricted to a predetermined amount on the developing roller by a toner regulating member. The toner restricted to the predetermined amount is conveyed to a developing region of a photosensitive drum and applied to the latent image on the photosensitive drum to form a toner image.

Conventionally, the photosensitive drum and a process means acting on the photosensitive drum are integrally put together in shape of a cartridge as a method of process cartridge which the cartridge is detachable from image forming apparatus. In recent years, because of a process cartridge (hereinafter, referred as a cartridge) with long-life, running distance of the developing roller is needed to be shorter. For example, the technique of slowing down a peripheral speed of the developing roller in the case that there is less amount of toner or speeding up the peripheral speed of the developing roller in the case that there is larger amount of toner according to an image data, is disclosed. This technique is designed for the cartridge to live long by making the running distance of the developing roller as short as possible (referred as Japanese Laid-Open Patent Application No. 2001-75358).

On the other hand, a configuration to make the peripheral speed of the developing roller slower compared with a peripheral speed of the photosensitive drum (that is, a rate of the peripheral speed of the developing roller with respect to the peripheral speed of the photosensitive drum is less than 100%) to make the distance of the developing roller further shorter is known well in recent years. However, when the peripheral speed of the developing roller is slower than the peripheral speed of the photosensitive drum, there is a risk an abnormal discharge occurs in an upper stream side from a primary transfer portion in a rotational direction of the photosensitive drum in the case that a toner deposition amount put uneven on the developing roller by various conditions.

SUMMARY OF THE INVENTION

To solve the problem as described above, the present invention provides as follows: an image forming apparatus comprising: a rotatable image bearing member configured to bear a toner image; an exposure means configured to form an electrostatic latent image on a surface of the image bearing member by exposing the surface of the image bearing member; a rotatable developing member configured to develop the electrostatic latent image with a developer; a voltage applying means capable of forming a developing potential on the developing member by applying a developing voltage to the developing member; a driving means configured to rotationally drive the developing member; and a control means capable of selectively executing an operation in a first mode and in a second mode by controlling a circumferential speed ratio of a circumferential speed of the developing member to a circumferential speed of the image bearing member and a potential difference between a surface potential of the image bearing member in a region where the electrostatic latent image is formed by the exposure means and the developing potential, wherein the first mode is a mode in which the circumferential speed ratio is a first circumferential speed ratio larger than 50% and less than 100% and the potential difference is a first potential difference, and wherein the second mode is a mode in which the circumferential speed ratio is a second circumferential speed ratio larger than the first circumferential speed ratio and less than 150% and the potential difference is a second potential difference less than the first potential difference.

Further features of the present invention will become apparent from the following description of exemplary embodiments with reference to the attached drawings.

DESCRIPTION OF THE EMBODIMENTS

In the following, embodiments of the present invention will be specifically described with reference to the figures.

Embodiment 1

[Basic Constitution of an Image Forming Apparatus]

Figure 1:
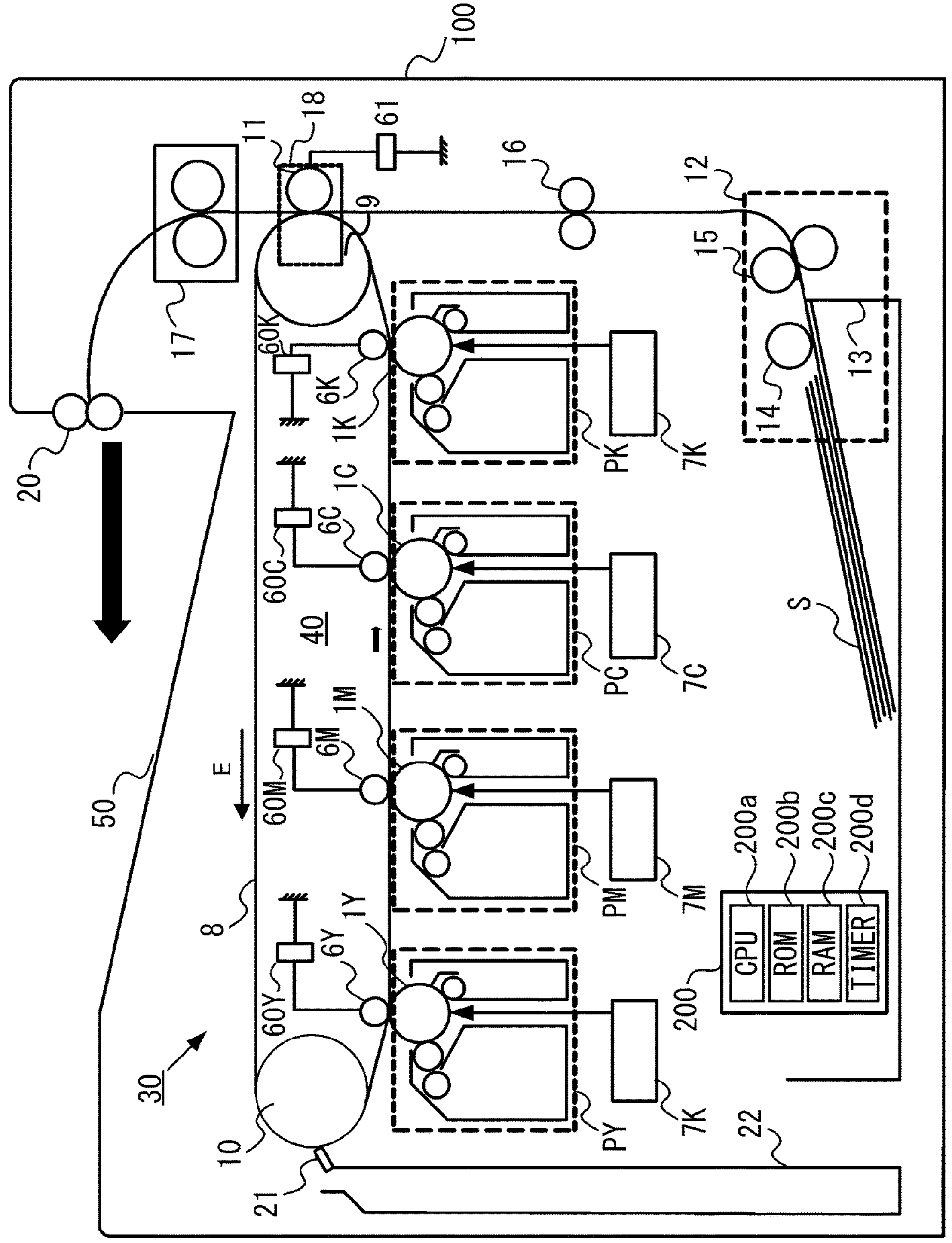
FIG. 1 is a cross-sectional view showing an image forming apparatus in embodiments 1, 2, 3, and 4.

FIG. 1 is a sectional view of a structure of an example of the image forming apparatus that transfers a toner image formed on a rotatable image bearing member onto a recording material. According to the embodiment 1, the toner is used as a developer and an intermediate transfer belt is used as an intermediate transfer member. In the following, full-color mode printing operation will be described. In the following description, a peripheral speed means a linear velocity that a surface speed of the photosensitive drum or the developing roller when they are rotating.

A toner image forming portion 30 forms an image with multi-color toner on a moving intermediate transfer belt 8, here that is, a toner image overlapped with four colors of yellow (Y), magenta (M), cyan (C), and black (K). The toner image forming portion 30 is provided with a cartridge PY, PM, PC, and PK as four cartridges that each cartridge is detachable from the image forming apparatus. Also, the toner image forming portion 30 includes an intermediate transfer belt unit 40 using the intermediate transfer belt 8. Four cartridges PY, PM, PC, and PK have the same constitution and each cartridge (PY, PM, PC, and PK) accommodates each of colored toner of yellow (Y), magenta (M), cyan (C), and black (K) to form a toner image. According to the embodiment 1, the toner that is 7 μm particle size and has negative polarity is used, for example. Note that, in the following description letters Y, M, C, and K applied to an end of numeral references indicate the toner colors and are omitted when common items in the four colors are described.

Figure 2:
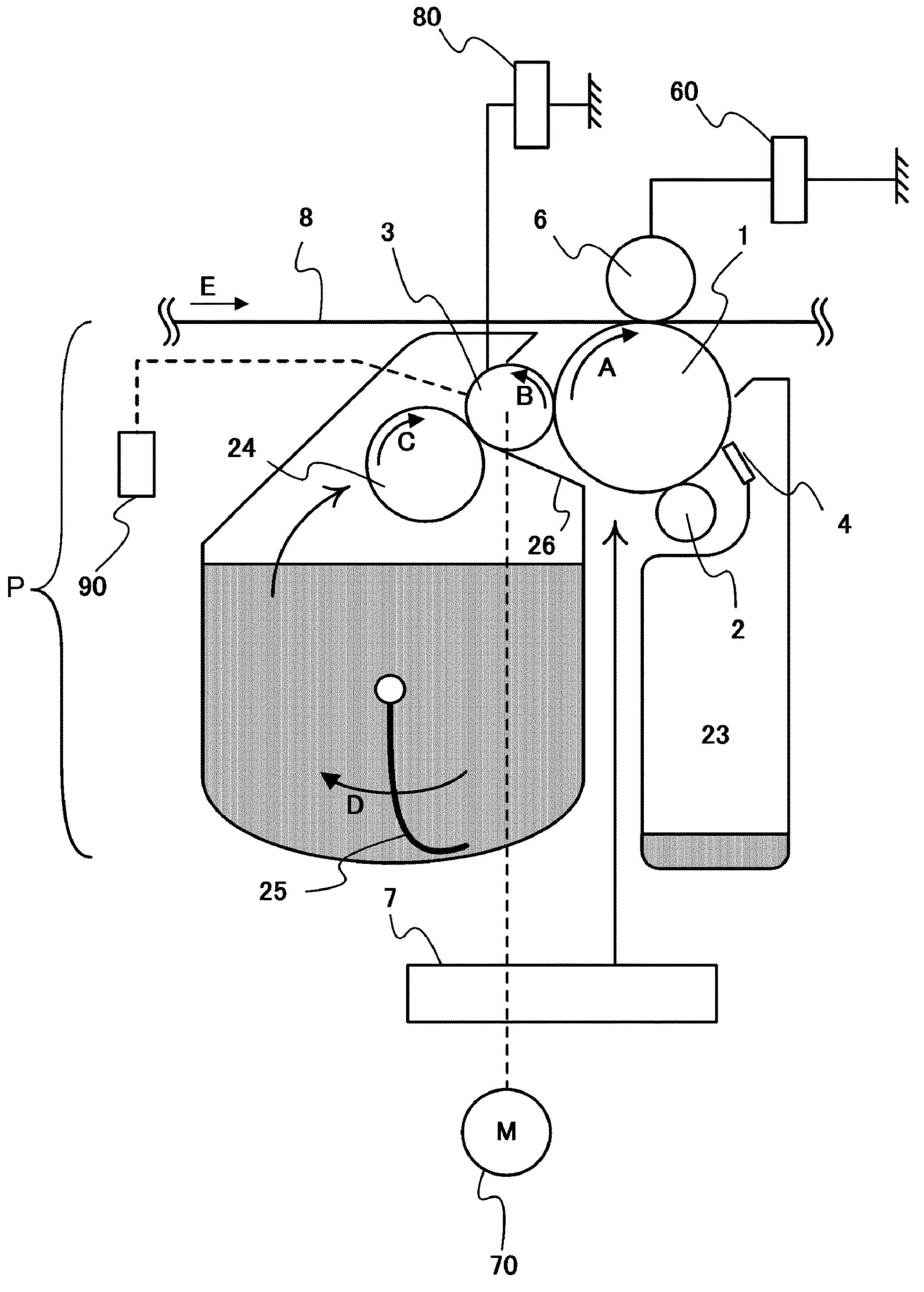
FIG. 2 is a transverse cross-sectional view showing a cartridge in the embodiments 1, 2, 3, and 4.
Figure 3:
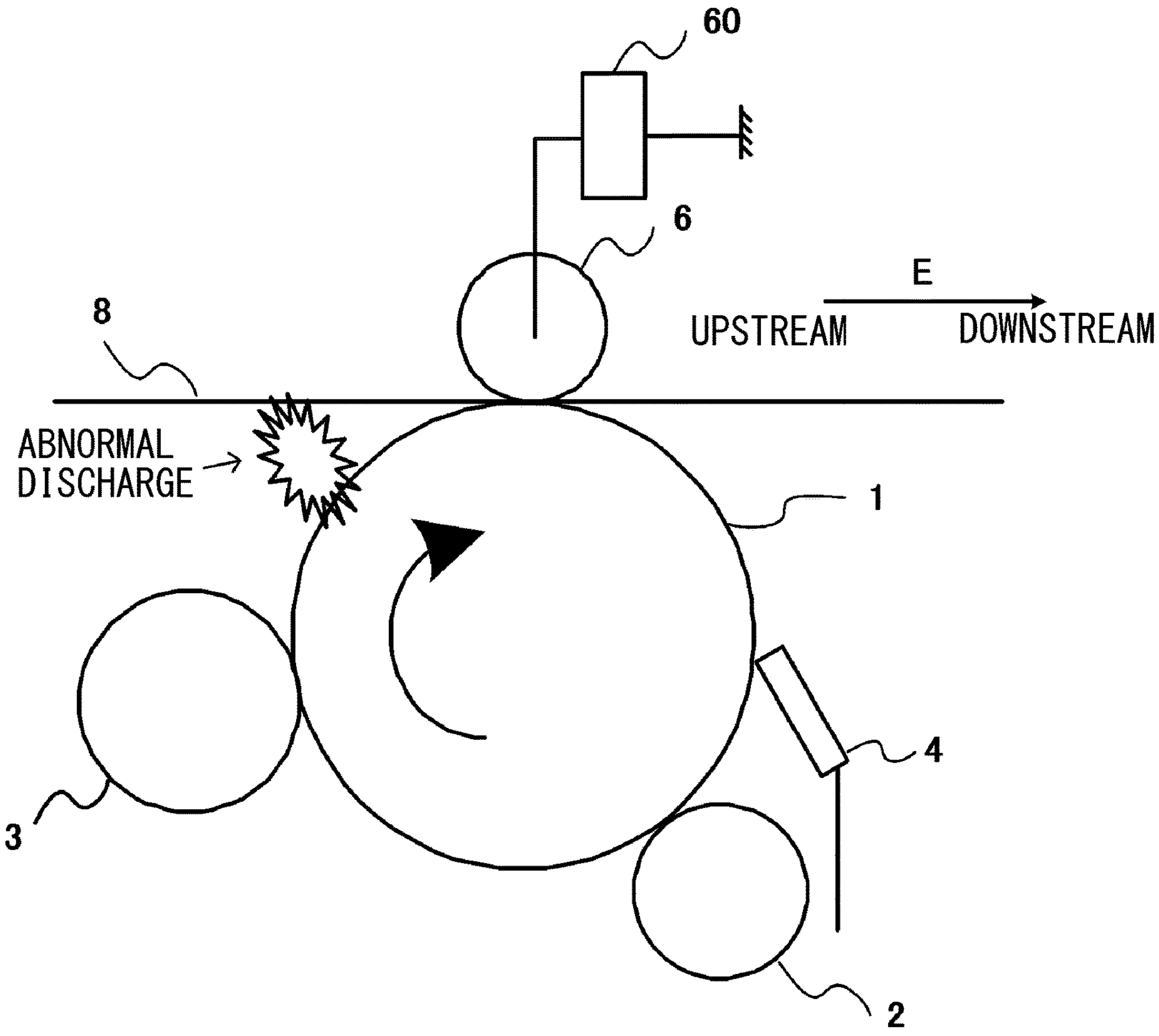
FIG. 3 is a schematic view showing a primary transfer portion in the embodiments 1, 2, 3, and 4.

FIG. 2 is a cross-sectional structure view showing a cartridge P in an image forming apparatus 100. The cartridge P includes a photosensitive drum 1 as an image bearing member. The photosensitive drum 1 is driven to rotate at a speed (hereinafter referred as a peripheral speed) of 300 mm/s, for example, in a direction of an arrow A (in a clockwise direction). The cartridge P includes a charging roller 2 charging the photosensitive drum 1 as a charging unit and the charging roller 2 charges the surface of the photosensitive drum 1 evenly by being applied charged high voltage with a negative polarity from a high voltage power source (not showing in the figure). Next, a laser unit 7 as an exposure unit emits a laser light on the photosensitive drum 1 according to an image information and forms an electrostatic latent image on the surface of the photosensitive drum 1. A developing roller 3 as a developing unit is applied a developing charge with negative polarity from a charge applying portion 80 as an applying unit applying the developing charge. Note that, a surface potential of the developing roller 3 applied the developing charge is referred as a developing potential. The developing roller 3 rotates in a direction of an arrow B (in counterclockwise direction) by a motor 70 as a driving unit and a toner of which surface is coated and charged is deposited along the electrostatic latent image on the photosensitive drum 1. Therefore, the electrostatic latent image turns into a visual image (a developer image). A detecting portion 90 is a detecting unit detecting rotation numbers of the developing roller 3. Hereinafter, the visual image by a toner is referred to as a toner image. For the developing roller 3 in the embodiment 1 a roller with an average surface roughness Rz=12 μm is used, for example. The surface roughness Rz of the developing roller 3 may be between 8.0 μm and 15.0 μm.

A base layer of the photosensitive drum 1 is grounded and a primary transfer roller 6 as a transfer unit is applied a positive charge by a primary transfer charge applying portion 60 (hereinafter, referred as a charge applying portion 60). Therefore, an electric field is formed in the nipping portion between the primary transfer roller 6 and the photosensitive drum 1, and the toner image is transferred to the intermediate transfer belt 8 from the photosensitive drum 1 (referred as a primary transferring). The toner which is left on the surface of the photosensitive drum 1 without being transferred on the intermediate transfer belt 8 in the primary transferring is removed from the photosensitive drum 1 by a drum cleaning blade 4 and is collected into a waste toner container 23. A toner supplying roller 24 supplies a toner to the developing roller 3 by rotating in a direction of an arrow C (clockwise direction). A mixer 25 supplies a toner to the toner supplying roller 24 by rotating in a direction of an arrow D (clockwise direction). The developing roller 3 is rubbed with the toner regulating blade by rotating itself because a toner regulating blade 26 is locked. A portion where the developing roller 3 rubs with the toner regulating blade 26 is referred to as a rubbing portion. The amount of the toner coated on the surface of the developing roller 3 is regulated as being charged with negative polarity. Therefore, developing with a stable density becomes possible.

Returning back to FIG. 1. The intermediate transfer belt unit 40 is comprised of the intermediate transfer belt 8 which is flexible and endless, and a driving roller 9 and a follow driving roller 10 which extend and stretch the intermediate transfer belt 8. Also, the primary transfer roller 6 is located facing to the photosensitive drum 1 inside the intermediate transfer roller 8 and each intermediate transfer roller is in contact on each corresponding photosensitive drum 1 through the intermediate transfer belt 8. A portion where each photosensitive drum 1 and the intermediate transfer belt 8 is referred as a primary transfer portion.

As a basic material of the intermediate transfer belt 8 in the embodiment 1, polyethylene naphthalate is used. Also, polycarbonate, polyvinylidene fluoride (PVDF), polyethylene, polypropylene, polymethylpentene-1, polystyrene, polyamide, polysulphone, polyarylate, polybutylene terephthalate, and polyimide can be used. Further, thermoplastic resin, such as polybutylene naphthalate, polyphenylene sulfide, polyether sulfone, polyether nitrile, thermoplastic polyimide, polyether ether ketone, thermotropic liquid crystal polymer, and polyamic acid are named. These can be mixed with more than two kinds to use.

An ionic conductive material which exhibits ionic conductivity is impregnated into thermoplastic resin mentioned above. For the ionic conductive material in the embodiment 1 an alkali metal salt is used. Specifically, perfluorobutanesulfonate potassium (nonafluorobutanesulfonate potassium; C4F9SO3K) is used. This is a material on the market as a 'KFBS' (made by Mitsubishi materials electric chemicals Co., Ltd.). Also, in order to increase surface hardness and improve durability (wear resistance) the intermediate transfer belt 8 may include the surface layer using a thermosetting or a curable material which is hardened by exposing an energy beam such as an ultraviolet radiation or an electron ray.

The intermediate transfer belt 8 is 70 μm thick, 790 mm perimeter, 250 mm width, $1.0\times10^{9}\Omega\cdot$cm volume resistivity, and $1.0\times10^{10}\Omega/\square$ surface resistivity, for example. Here, the perimeter is referred as a length of the intermediate transfer belt 8 in its rotational direction (direction of an arrow E) and the width is referred as the length cross at right angle of the intermediate transfer belt 8 in its rotational direction. A measurement is made with Hiresta UP MCP-HT450 (made by Mitsubishi Chemicals Co.) under 23° C. temperature, 50% relative humidity, and 500V applying charge used. Note that, a value of the surface resistivity is measured on the backside of the intermediate transfer belt 8.

The intermediate transfer belt 8 rotates (moves) at 300 mm/s rotational speed according to a peripheral speed of the photosensitive drum in the direction of arrow E (counterclockwise direction) by the rotation of the driving roller 9. Each toner image formed on the photosensitive drum 1 is sequentially overlapped and primary-transferred on the intermediate transfer belt 8 in a primary transfer portion. In the other words, on the surface of the intermediate transfer belt 8, a four color toner image is formed by overlapping in an order of color Y, color M, color C, and color K. The toner image with four colors is conveyed by a rotation of the intermediate transfer belt 8 to a secondary transfer portion which is a contact portion of the intermediate transfer belt 8 and a secondary transfer roller 11 as a secondary transfer member.

A feeding device 12 includes a feeding roller 14 feeding a recording material S from inside of a cassette 13 stacking and storing sheets of the recording material and a pair of conveying rollers 15 conveying the recording material S fed. The recording material S conveyed from the feeding device 12 at 300 mm/s according to the rotational speed of the intermediate transfer belt 8 is guided to a secondary transfer portion 18 by a pair of registration rollers 16 at a predesignated timing. The recording material S is clamped and fed by the secondary transfer roller 11 and the intermediate transfer belt 8. A secondary transfer charge applying portion 61 (hereinafter referred as a charge applying portion 61) applies charge with a positive polarity to the secondary transfer roller 11. Therefore, the toner image overlapped with four colors on the intermediate transfer belt 8 is collectively transferred onto the recording material S nipped and fed in the secondary transfer portion 18 (secondary transferring). The toner which was not transferred onto the recording material from the intermediate transfer belt 8 by the secondary transfer is scraped by a cleaning blade 21 as a cleaning unit and collected in the waste toner collecting container 23 after the intermediate transfer belt 8 rotates in the direction of the arrow E. The recording material S on which the image formed and not fixed yet by the secondary transfer is guided to a fixing device 17. The toner image on the recording material S heated and fixed in the fixing device 17 is discharged to a discharging tray 50 by a pair of discharging rollers 20.

The image forming apparatus 100 is provided with a control unit 200 controlling the entire image forming apparatus 100 such as image forming operation or the recording material feeding operation by controlling each portion described above. The control unit 200 includes a CPU 200*a*, for example. The CPU 200*a* executes a program memorized in an ROM 200*b* as controlling a timing by a timer 200*d* and using an RAM 200*c* as a temporally working area. The control unit 200 controls a motor 70 to make a rate of the peripheral speed of the photosensitive drum 1 and the peripheral speed of the developing roller 3 be a predetermined rate. For example, in a case that the control unit 200 controls the motor 70 to make the peripheral speed rate as 1:1, the peripheral speed of the developing roller 3 is 300 mm/s when the peripheral speed of the photosensitive drum 1 is 300 mm/s. Note that, the constitution of the image forming apparatus is not limited to the constitution described in FIG. 1.

[Mechanism of an Abnormal Discharge in an Upstream of a Primary Transfer]

A defective image by an abnormal discharge occurring in an upstream from the primary transfer portion (hereinafter, referred as a primary transfer upstream portion) in the rotational direction of the photosensitive drum 1 (in other words, the direction of the arrow E which is the rotational direction of the intermediate transfer belt 8) (referred as an abnormal discharge) will be described in the following. The abnormal discharge occurs between the photosensitive drum 1 and the intermediate transfer belt 8 in the primary transfer upstream portion when a big potential gap occurs there. Once the abnormal discharge occurs, the toner image which is exists in a place where the abnormal discharge occurs is disturbed and visualized as, for example, longitudinal stripes on the intermediate transfer belt 8.

Three causes of the abnormal discharge will be described. First, the abnormal discharge is likely to occur in printing a solid image. Because the solid image uses a large amount of toner on the photosensitive drum 1 and a negative electric potential becomes high on the surface of the photosensitive drum 1 including a toner layer. Thus, a large potential difference is generated between the photosensitive drum 1 and the intermediate transfer belt 8.

Second, the abnormal discharge is likely to occur when a charge amount of the toner is large. Because the potential difference between the photosensitive drum 1 and the intermediate transfer belt 8 becomes large in the case that the toner amount is large. Since the charge amount of the toner changes according to a usage count (a durable number of sheets) or usage circumstance of the cartridge P, these conditions also affect whether the abnormal discharge occurs.

Figure 4:
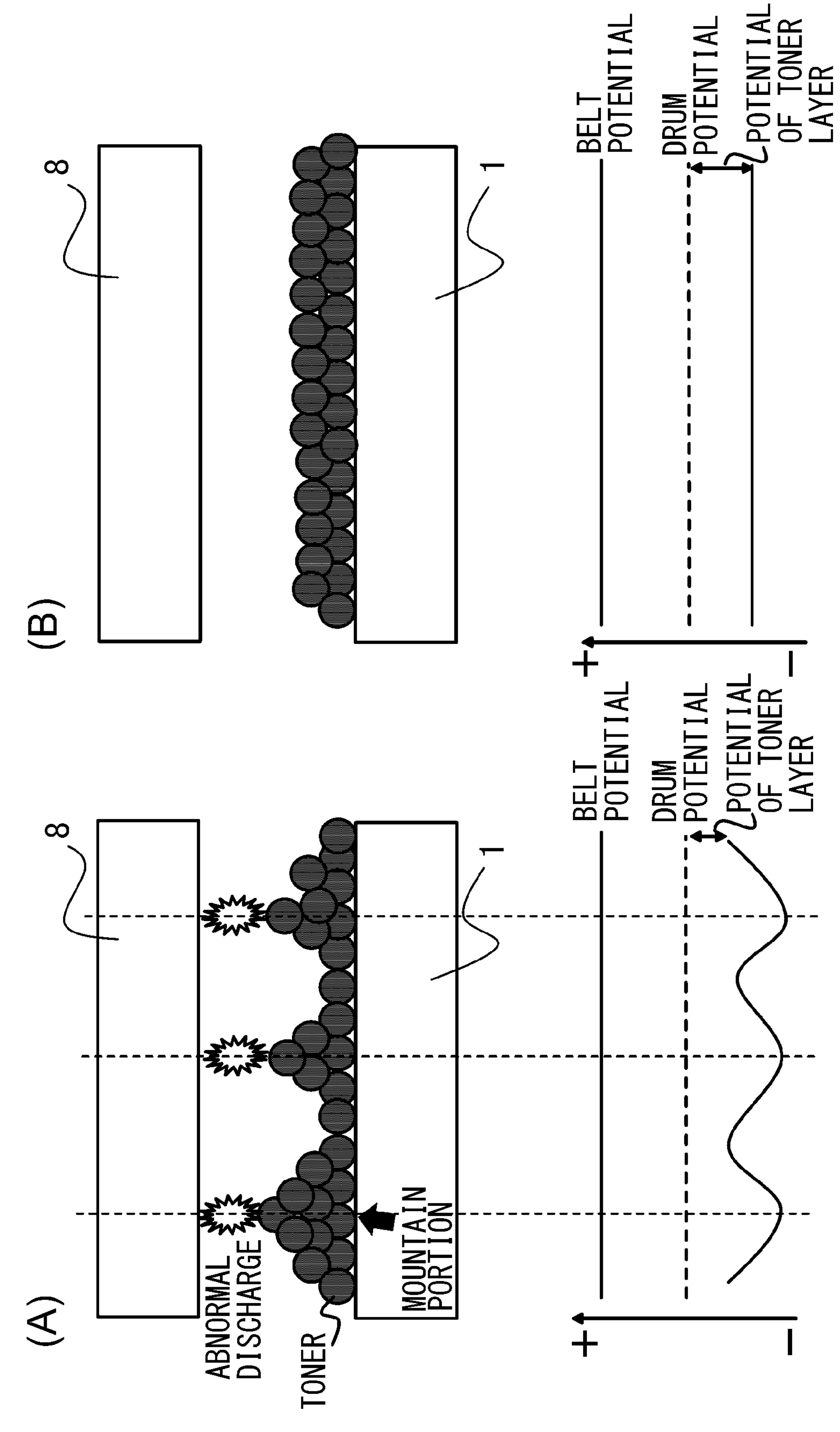
FIG. 4, part (A) and part (B), is a schematic view of unevenness of toner deposition amount and an abnormal discharge in the embodiments 1, 2, 3, and 4.

Third, the abnormal discharge is likely to occur when unevenness of toner deposition amount is large. FIG. 4, part (A) and part (B), is a schematic view showing unevenness of the toner deposition amount and the abnormal discharge. Also, it is showing the potential according to both unevenness of the toner deposition amount and the abnormal discharge. An upper side of FIG. 4, part (A) and part (B), is a schematic view showing the intermediate transfer belt 8 and the photosensitive drum 1 applied with the toner. A lower side of FIG. 4, part (A) and part (B), is a graph showing a relation of a position and a potential of both the intermediate transfer belt 8 and the photosensitive drum 1. The graph in the lower side shows each potential of the intermediate transfer belt 8 (a belt potential), the surface of the photosensitive drum 1 (a drum potential), and the toner layer on the photosensitive drum 1 (a toner layer potential).

FIG. 4 (A) shows a case that the unevenness of the toner deposition amount on the photosensitive drum 1 is large. FIG. 4 (B) shows a case that the unevenness of the toner deposition amount on the photosensitive drum 1 is small. Note that, the amount of the toner deposition is in the same condition in both FIG. 4 (A) and (B). The toner deposition amount means a weight of the toner per a unit of area on the photosensitive drum 1. The weight of the toner is measured in an area of about 10 $cm^2$ and converted to a unit of $mg/cm^2$. The unevenness of the toner deposition is an uneven part by a degree of the toner deposited.

The potential difference with the intermediate transfer belt 8 becomes large locally in a crest portion (convex portion) of the toner and the abnormal discharge occurs by current concentrating at the crest portion as a starting point in FIG. 4 (A) showing that the unevenness of the toner deposition amount is large. In an actual measurement a distance between a crest portion and an adjacent crest portion of the toner is about 50 μm and a height of the crest portion is 14 μm. On the other hand, in FIG. 4 (B) showing that the unevenness of the toner deposition amount is small, the potential is even on the surface and the abnormal discharge is hardly occurred. By the mechanism described above, the abnormal discharge is likely to occur when the unevenness of the toner deposition amount is large.

Figure 5:
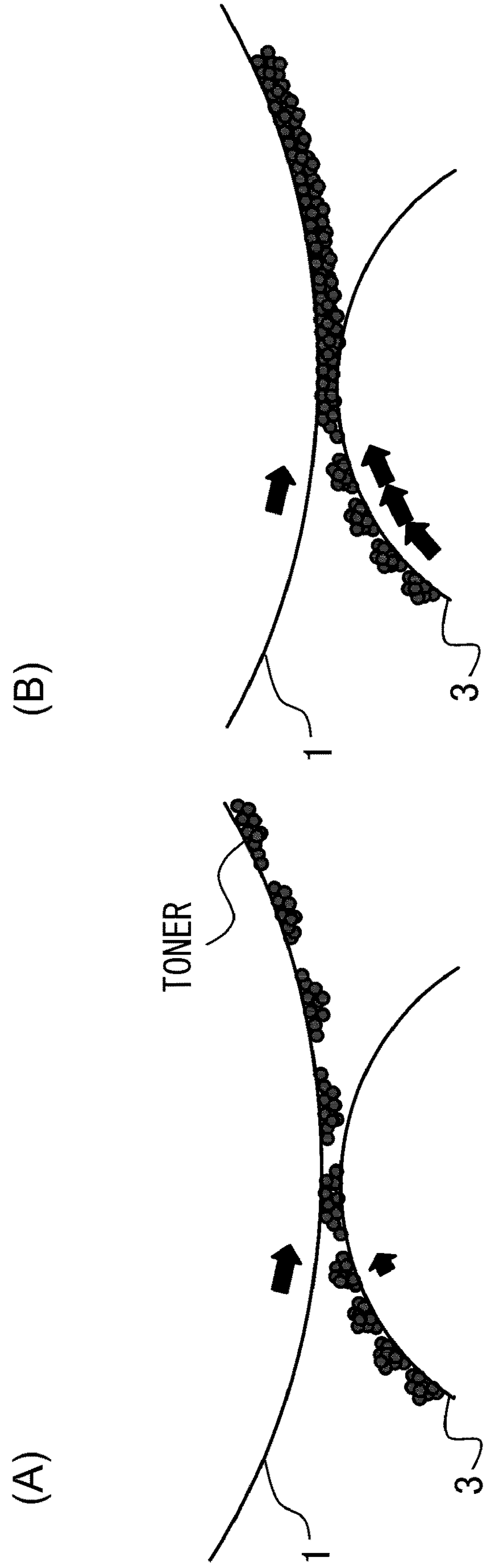
FIG. 5, part (A) and part (B), is a schematic view of a peripheral speed difference and unevenness of toner deposition amount in the embodiments 1, 2, 3, and 4.

In order to decrease the unevenness of the toner deposition amount there is a method to speed up the peripheral speed of the developing roller 3 with respect to the peripheral speed of the photosensitive drum 1. FIG. 5 (A) shows a case that the peripheral speed of the developing roller 3 is slow with respect to the peripheral speed of the photosensitive drum 1. In this case the unevenness of the toner deposition on the developing roller 3 is left in an extended shape on the photosensitive drum 1. On the other hand, FIG. 5 (B) shows a case that the peripheral speed of the developing roller 3 is fast with respect to the peripheral speed of the photosensitive drum 1. In this case a space between the unevenness of the toner deposition on the developing roller 3 is narrowed on the photosensitive drum 1 and the toner layer can be evenly formed.

[A First Mode and a Second Mode]

A first mode and a second mode of a printing mode in the embodiment 1 will be described below. A rate of the peripheral speed of the developing roller 3 with respect to the peripheral speed of photosensitive drum 1 is referred to as a drum-developing peripheral speed ratio (hereinafter, referred as a peripheral speed ratio). The potential difference between the surface potential (light portion potential) of the photosensitive drum 1 after exposing of the solid image and the developing charge applying the developing roller 3 is referred to as a developing contrast.

When the peripheral speed ratio is large, the toner deposition amount on the photosensitive drum 1 is increased and the amount of the toner consumed is increased. Thus, in the embodiment 1 the developing contrast is changed to keep the fixed consumption even if the peripheral speed ratio is changed. For example, the developing contrast is configured to be 270V at the 90% ratio of the peripheral speed and the developing contrast is configured to be 220V at the 110% ratio of the peripheral speed. That is, the toner deposition amount is kept at 0.45 mg/cm$^2$ as a fixed amount in either setting value by configuring the developing contrast to be smaller when the ratio of the peripheral speed is larger. The developing contrast is controlled according to an exposing amount of the laser unit 7 or the developing charge by the applying charge portion 60.

TABLE 1

| Drum-developing peripheral speed ratio % | Developing contrast | Abnormal discharged image |
|---|---|---|
| 50 | No appropriate value | X(impossible to form image) |
| 60 | 400 | Δ |
| 70 | 350 | Δ |
| 90 | 270 | Δ |
| 95 | 260 | Δ |
| 100 | 240 | ○ |
| 105 | 230 | ○ |
| 110 | 220 | ○ |
| 130 | 190 | ○ |
| 140 | 170 | ○ |
| 150 | 160 | X |

○: not occurred
Δ: occurred/OK
X: occurred

Table 1 shows whether an abnormal discharged image occurs on printing a monochrome solid image when the developing contrast is changed to be a fixed amount of the toner deposition on the photosensitive drum 1 according to the drum-developing peripheral speed ratio (%). A first column of Table 1 shows the drum-developing peripheral speed ratio (%), a second column shows the developing contrast (V), and a third column shows whether the abnormal discharged image existed and etc. (×(occurred), Δ(occurred/OK), and ○(not occurred)). Note that, 'Δ(occurred/OK)' means that an image quality is not defected as much as × though the abnormal discharged image is occurred more compared with ○.

At the peripheral speed ratio 50%, a result was not able to be obtained because the image forming was impossible. When the peripheral speed ratio was getting down to 50%, the toner amount developing on the photosensitive drum 1 became extremely too small to keep a fixed amount of the toner deposition on the photosensitive drum 1 even the developing contrast has been larger. Between the peripheral speed ratio 60% and 95% the defected image was obtained though a minor abnormal discharge has occurred. On the other hand, the abnormal discharge has not occurred between the peripheral speed ratio 100% and 140% because the unevenness of the toner deposition amount on the photosensitive drum 1 was decreased by increasing the peripheral speed ratio. At the 150% the abnormal discharge occurred again because the toner charge amount was raised by that the toner has been rubbed and charged between the photosensitive drum 1 and the developing roller 3 as the peripheral speed ratio was increased further.

From results described above a range of the peripheral speed ratio of the first mode is configured to be larger than 50% and smaller than 100%. A range of the peripheral speed ratio of the second mode is configured to be 100% and larger and less than 150%. In the other words, the first mode focuses (prioritizes) on a durability of the cartridge P and the second mode suppresses the abnormal discharged image as decreasing toner consumption. Note that, it is not limited to the setting that the developing contrast is uniquely set to the peripheral speed ratio to make toner deposition amount be constant in the embodiment 1.

Effect of the Embodiment 1

The embodiment 1 and a comparative example 1 will be described with Table 2. The comparative example 1 shows a case provided with only the first mode which is configured as the peripheral speed ratio is 90% and the developing contrast is 270V. The embodiment 1 is provided with both the first mode described above and the second mode which is configured as the peripheral speed ratio is 110% and the developing contrast is 220V to be able to switch the mode according to a purpose of use by users.

TABLE 2

| | Comparative example 1 | Embodiment 1 |
|---|---|---|
| Abnormal discharged image | Δ | ○ |
| Cartridge durability | ○ | ○ |

○: Excellent
Δ: Good

Table 2 shows an occurring situation of the defected image (abnormal discharged image) and the durability of the cartridge P in the comparative example 1 and the embodiment 1 with rating with (○:(Excellent)) and (Δ:(Good)). In the comparative example 1 the durability of the cartridge P is possible by slowing down the peripheral speed ratio and forming image is possible as well even if the abnormal discharge occurs. On the other hand, in the embodiment 1, as both results are excellent, the durability of the cartridge P is possible by switching into the first mode and suppressing the abnormal discharged image is possible by switching into the second mode.

Based on above, the control unit 200 executes to form the image in the first mode or the second mode. The first mode controls the motor 70 to make the peripheral speed ratio be a first peripheral speed ratio (for example, 90%) and the laser unit 7 and/or the applying charge portion 80 to make the developing contrast be a first potential difference (for example, 270V). The second mode controls the motor 70 to make the peripheral speed ratio be a second peripheral speed ratio (for example, 110%) and the laser unit 7 and/or the applying charge portion 80 to make the developing contrast be a second potential difference (for example, 240V). Here, the second peripheral speed ratio is larger than the first peripheral speed ratio and the second potential difference is smaller than the first potential difference. The first peripheral speed ratio is 60% or larger and less than 100% in the first mode, the second peripheral speed ratio is 100% or larger and less than 140% in the second mode. The weight per unit area of the toner applied on the photosensitive drum 1 in the first mode equals to the weight per unit area of the toner applied on the photosensitive drum 1 in the second mode.

As described above, the situation that the abnormal discharge occurs will vary by the toner amount or the charge amount of the toner. The toner amount changes depending on a printing image and the charge amount of the toner changes by the durable number of sheets of the cartridge P or the usage circumstance. In the comparative example 1 the peripheral speed of the developing roller 3 is slowed down (to 90%), which makes a longer durability of the cartridge P possible, but depending on the conditions the abnormal discharge may occur. On the other hand, in the embodiment 1 in the situation that the abnormal discharged image occurs, it is possible to switch to the second mode when necessary. Therefore, while minimizing the effect on the durability of the cartridge P, the abnormal discharged image can be suppressed.

Based on above, according to the embodiment 1, a configuration that allows the selection of a mode which prioritizes the cartridge durability or a mode which suppresses the abnormal discharge occurring in the upstream side from the primary transfer portion in the rotational direction of the photosensitive drum 1 can be offered.

Embodiment 2

Corresponding to a diversification of the market in recent years, a case that wide color gamut printing is needed for a photo print, etc. has been increasing more than ever. The wide color gamut printing makes a color gamut of an image wider and a better quality of image forming possible. In wide color gamut printing a ratio of the peripheral speed of the photosensitive drum 1 and the peripheral speed of a developing roller 3 is controlled to be larger than a normal image forming process. An embodiment 2 includes a third mode in addition to a first mode prioritizing the durability of a cartridge P and a second mode suppressing an abnormal discharged image while considering a toner consumption. The third mode makes a ratio of a peripheral speed larger, as well as makes a developing contrast larger to widen color gamut. Note that, since a basic structure of an image forming apparatus 100 is the same as the embodiment 1, the same reference numerals will be marked in the same configuration and the description will be omitted.

[Third mode]

In the third mode the ratio of the peripheral speed is configured to be 110% and the developing contrast is configured to be 300V, for example. Raising the ratio of the peripheral speed, increasing a possible amount of the developing, and enlarging the developing contrast increase a toner deposition amount on a photosensitive drum 1. Since the first mode and the second mode are the same with the embodiment 1, the description will be omitted. Though the toner deposition amount on the photosensitive drum 1 in the first and second mode is 0.45 mg/cm$^2$, in the third mode a toner deposition amount is 0.55 mg/cm$^2$ which is larger than the other modes. Since a peripheral speed is configured to be 110% in the third mode, unevenness of a toner deposition amount is little and an abnormal discharge can be suppressed.

Effect of the Embodiment 2

The embodiment 2 and a comparative example will be described with Table 3. A comparative example 1 is the same as described above. The embodiment 2 is provided with the third mode in addition to the first mode and the second mode as well as the embodiment 1 as showing a case that a user can switch the mode according to a purpose of use.

TABLE 3

| | Comparative example 1 | Embodiment 2 |
|---|---|---|
| Abnormal discharged image | Δ | ○ |
| Cartridge durability | ○ | ○ |
| Wide color gamut printing | — (not compatible) | ○ (compatible) |

○: excellent
Δ: OK

Table 3 shows a state of the wide color gamut printing in addition to occurring situation of an abnormal discharged image and a cartridge durability with (○(excellent)), (Δ(OK)) in the comparative example 1 and embodiment 2.

In the comparative example 1, while the wide color gamut printing is compatible, it is possible to minimize an effect to the durability of a cartridge P and it is also possible to form an image though the abnormal discharged image occurs. In the embodiment 2, with the third mode provided, an effect to the durability is minimized, the abnormal discharge is suppressed to obtain an excellent result, and the wide color gamut printing is compatible. Therefore, the embodiment 2 will deal with a diverse market.

As described above, a control unit 200 forms an image with the third mode for the wide color gamut printing. The third mode controls a motor 70 to be a third ratio of the peripheral speed (for example, 110%) and controls a laser unit 7 and/or a charge applying portion 80 to make a developing contrast a third potential difference (for example 300V). The third ratio of the peripheral speed is larger than a first ratio of the peripheral speed and the third potential difference is larger than a first potential difference. A toner weight per unit area applied on a photosensitive drum 1 in the third mode is larger than a toner weight per unit area applied on the photosensitive drum 1 in the first mode or the second mode.

Based on above, according to the embodiment 2, a configuration that allows the selection of a mode which prioritizes the cartridge durability or a mode which suppresses the abnormal discharge occurring in the upstream side from the primary transfer portion in the rotational direction of the photosensitive drum 1 can be offered.

Embodiment 3

As the mechanism of the abnormal discharge in the primary transfer upstream portion in the embodiment 1, the abnormal discharge is likely to occur in a solid image and visualized when the solid image exists in the wide area. Note that, the solid image includes not only a toner image formed on a whole region that is able to be formed an image on the photosensitive drum 1 but also a toner image continuously formed and hold a predetermined area. In a third embodiment an example that the first mode and the second mode are switched corresponding to a printing image data will be described. Note that, since a basic structure of an image forming apparatus 100 is the same as the embodiment 1, the same reference numerals will be marked in the same configuration and the description will be omitted.

[Solid Image Data and the Abnormal Discharge]

Table 4 shows a visibility difference of an abnormal discharged image by a solid image area in the first mode as described above.

TABLE 4

| Solid image area $mm^2$ | Abnormal discharge image |
|---|---|
| 100 | ○ |
| 200 | ○ |
| 300 | ○ |
| 400 | Δ |
| 500 | Δ |
| 600 | Δ |
| 700 | Δ |

○: not observed any occurrence
Δ: occurred but not remarkable

Table 4 shows the solid image area ($mm^2$) in the first column and the abnormal discharged image (○: not observed any occurrence, Δ: occurred but not remarkable).

For an evaluation in the embodiment 3 the same shape is used: a square here. While the abnormal discharge is not observed when an area of the solid image is less than 300 $mm^2$, the abnormal discharge occurs but is not remarkable when the area of the solid image is larger than 400 $mm^2$. In the other words, when the solid images of the same shape have different areas, a first threshold value whether the abnormal discharge occurs is 400 $mm^2$, for example. This means the abnormal discharge occurs in a case that the solid image exists in a certain wide area. Note that, the abnormal discharge occurs but it is not remarkable. The first threshold value is not limited to 400 $mm^2$, but it is configured depending on a specification of an image forming apparatus 100, etc.

Next, Table 5 shows a visibility difference of an abnormal discharged image by a difference of a shape of the same area: 400 $mm^2$ rectangle of the solid image.

TABLE 5

| Diagonal distance (mm) | Abnormal discharge image |
|---|---|
| 28 | Δ |
| 41 | Δ |
| 51 | Δ |
| 80 | ○ |
| 200 | ○ |

○: not occurred
Δ: occurred but not remarkable

Table 5 shows a distance of a diagonal line of the shape of the solid image in a first column and whether the abnormal discharge occurs in a second column. Here, ○ shows that the abnormal discharge was not observed any occurrence, Δ shows that the abnormal discharge occurred but was not remarkable.

The difference of the shape is shown by the diagonal distance. While the abnormal discharge is observed when the diagonal distance is 51 mm and less, the abnormal discharge has not occurred when the diagonal distance 80 mm and larger. In other words, when the diagonal distance is different of the solid images that have the same area, a second threshold value whether the abnormal discharge occurs is 51 mm, for example. This means that the abnormal discharge hardly occurs with a long and narrow shape and is likely to occur when the shape gets closer to be a square. From the result above, the solid image area 400 $mm^2$ is set as a threshold value to determine for switching mode. Also, to deal with other than a polygon, as using the length of the diagonal line which is a distance between the farthest points (for example, diagonal line) in the solid image region, the diagonal line (diagonal distance) 51 mm is set as the threshold value to determine for switching mode. Note that, the second threshold value is not limited to 51 mm, but it is configured depending on the specification of the image forming apparatus 100, etc.

[Switching Mode Control]

Figure 6:
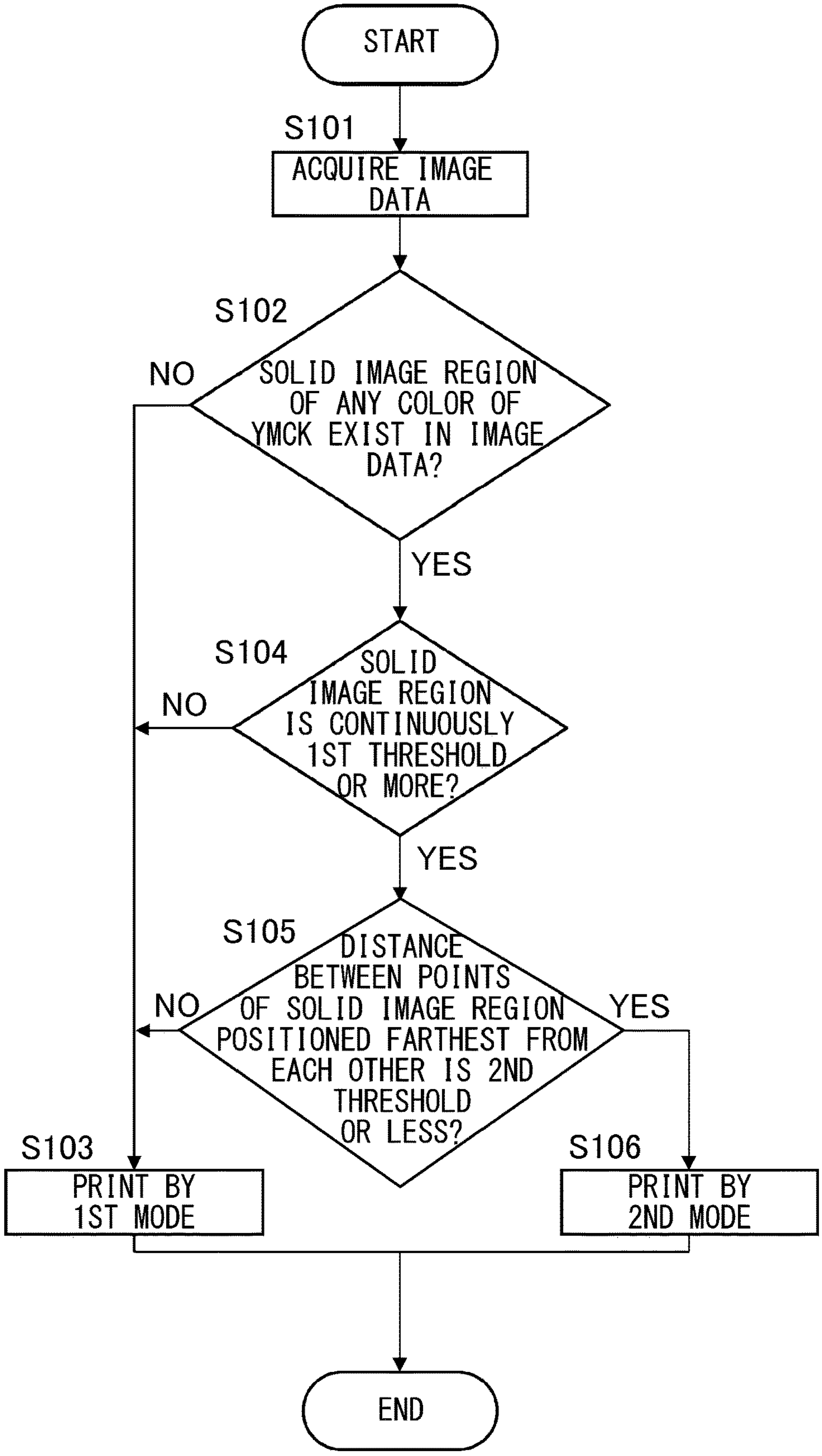
FIG. 6 is a flowchart showing a mode switching control in the embodiment 3.

FIG. 6 is a flowchart showing a process of switching the first mode and the second mode according to an image data. The first mode and the second mode are the same as the embodiment 1. In a step (hereinafter, referred to as S) 101, a control unit 200 [of the] of the image forming apparatus 100 acquires an image data from a host device (not shown in figures) such as a personal computer (hereinafter, referred to as PC). In S102 the control unit 200 determines whether there is a solid image region of any color of YMCK in the image data acquired in S101. A process is proceeded to S103 when the control unit 200 determines that there is no solid image region of any color of four. The process is proceeded to S104 when the control unit 200 determines that there is a solid image region in even only one color. In S103 the control unit selects a first mode, executes printing in the first mode, and then ends the process.

In S104 the control unit 200 determines whether the solid image region continuously extends more than a first threshold value (for example, 400 $mm^2$). The process is proceeded to S103 when the control unit 200 determines that the solid image region continuously extends less than a first threshold value. The process is proceeded to S105 when the control unit 200 determines that the solid image region continuously extends more than a first threshold value.

In S105 the control unit 200 determines whether the distance between the farthest points in the solid image region (for example, the diagonal distance) is less than the second threshold value (for example, 51 mm). The process is proceeded to S103 when the control unit 200 determines that the diagonal distance is larger than the second threshold value. The process is proceeded to S106 when the control unit 200 determines that the diagonal distance is the same or less than the second threshold value. In S106 the control unit selects a second mode, executes printing in the second mode, and then ends the process.

Note that, though the solid image, in the other word, a density and the area of the region (solid image region) with this density and the shape of the region are determined by a specific threshold value in the embodiment 3, it is not limited to these. They may be adjusted according to a feature of a toner adopted, a resistance of an intermediate transfer belt, a charge of a primary transfer, a structure of a cartridge P, or a circumstance. Also, as FIG. 6 determination about more than two requirements to proceed may be provided or may be only one requirement provided.

[Effect]

A comparative example 1 and an embodiment 3 will be described with Table 6. The comparative example 1 is the same as described above.

TABLE 6

| | Comparative example 1 | Embodiment 3 |
|---|---|---|
| Abnormal discharged image | Δ | ○ |
| Cartridge durability | ○ | ○ |
| Automatic switching mode | — (not compatible) | ○ (compatible) |

○: Excellent
Δ: OK

Table 6 shows an automatic switching mode in addition to occurring situation of an abnormal discharged image and a cartridge durability. Each experience is shown with (○(excellent)), (Δ(OK)), compatible (○), and not compatible (—) in the comparative example 1 and embodiment 3.

The embodiment 3 shows a case that both the first mode and the second mode are provided and switched automatically according to the image data by controlling as described above. In the embodiment 3 printing is executed in the second mode automatically in the case that the image has high possibility of the abnormal discharge. On the other hand, in the comparative example 1 the abnormal discharged image is not able to be suppressed and automatic switching mode is not available since there is not provided several modes (not compatible) while the cartridge durability is practical.

As described above, the control unit 200 switches the first mode and the second mode according to the image data. In detail, the control unit 200 switches the first mode and the second mode according to an area of a toner image region that continuously extends. The control unit 200 executes image forming in the first mode when the area of a toner image region that continuously extends is less than the first threshold value. Also, the control unit 200 switches the first mode and the second mode according to the shape of the continuously extended region. The control unit 200 executes image forming in the first mode when the area of a toner image region continuously extends is the first threshold value or larger and the distance between the farthest two points in the region shape is longer than the second threshold value. On the other hand, the control unit 200 executes image forming in the second mode when the distance between the farthest two points in the region shape is the second threshold value or less.

Based on above, according to the embodiment 3, a configuration that allows the selection of a mode which prioritizes the cartridge durability or a mode which suppresses the abnormal discharge occurring in the upstream side from the primary transfer portion in the rotational direction of the photosensitive drum 1 can be offered.

Embodiment 4

As the mechanism of the abnormal discharge in the primary transfer upstream portion in the embodiment 1, the abnormal discharge changes according to the usage condition (durability) of the cartridge P since the abnormal discharge is affected by the toner charge amount. Therefore, in an embodiment 4 an example of switching a first mode and a second mode according to a durable condition will be described. Note that, since a basic structure of an image forming apparatus 100 is the same as the embodiment 1, the same reference numerals will be marked in the same configuration and the description will be omitted.

[Lifetime of a Cartridge and an Abnormal Charged Image]

TABLE 7

| cartridge lifetime % | 100 | 90 | 80 | 70 | 60 | 50 | 30 | 10 |
|---|---|---|---|---|---|---|---|---|
| Abnormal discharged image | Δ | Δ | Δ | Δ | Δ | ○ | ○ | ○ |

○: not occurs
Δ: occurs but not remarkable

Table 7 shows a lifetime of a cartridge P (hereinafter, referred as a cartridge lifetime) and whether an abnormal discharged image occurs. The cartridge lifetime is expressed with % and the abnormal discharged image is shown 'no occurrence observed' with(○) or 'occurrence observed but not remarkable' with (Δ) for each cartridge lifetime.

In the embodiment 3, for example, numbers of rotation of a developing roller 3 detected by a detecting portion 90 is used as a means for detecting the cartridge lifetime. That is, the more rotation numbers of the developing roller 3, the shorter the cartridge lifetime becomes (or the more consumed). Note that, the lifetime 100% means a lifetime of a new and an unused cartridge and this value is decreasing as the cartridge P is used for a long time. Since the means of detecting the cartridge lifetime is not limited to the means detecting numbers of the developing roller 3, any means such as a means can acquire detecting results showing a relation with the cartridge lifetime, for example, numbers of sheets of a recording material on which an image is formed. A control unit 200 memorizes the cartridge lifetime (for example 70%) acquired by the detecting unit in a memory unit such as a RAM 200*c*, for example.

As Table 7 shows, the abnormal discharge is not remarkable despite it occurs when the cartridge lifetime is 100% and no abnormal discharge occurs when the cartridge lifetime is 50% or less. In the other words, a third threshold value whether the abnormal discharge occurs is 60%, for example, as the cartridge lifetime decreasing. As a number of a recording sheets S that are fed (hereinafter, referred as a passing sheet number) increases (going on), a toner charging amount decreases since a shape of a toner surface changes or an external additive comes off by rubbing between the developing roller 3 and a toner regulating blade 26, or between the developing roller 3 and a photosensitive drum 1. Therefore, as the cartridge lifetime decreases, the abnormal discharge is hardly occurs.

[Mode Switching Control]

Figure 7:
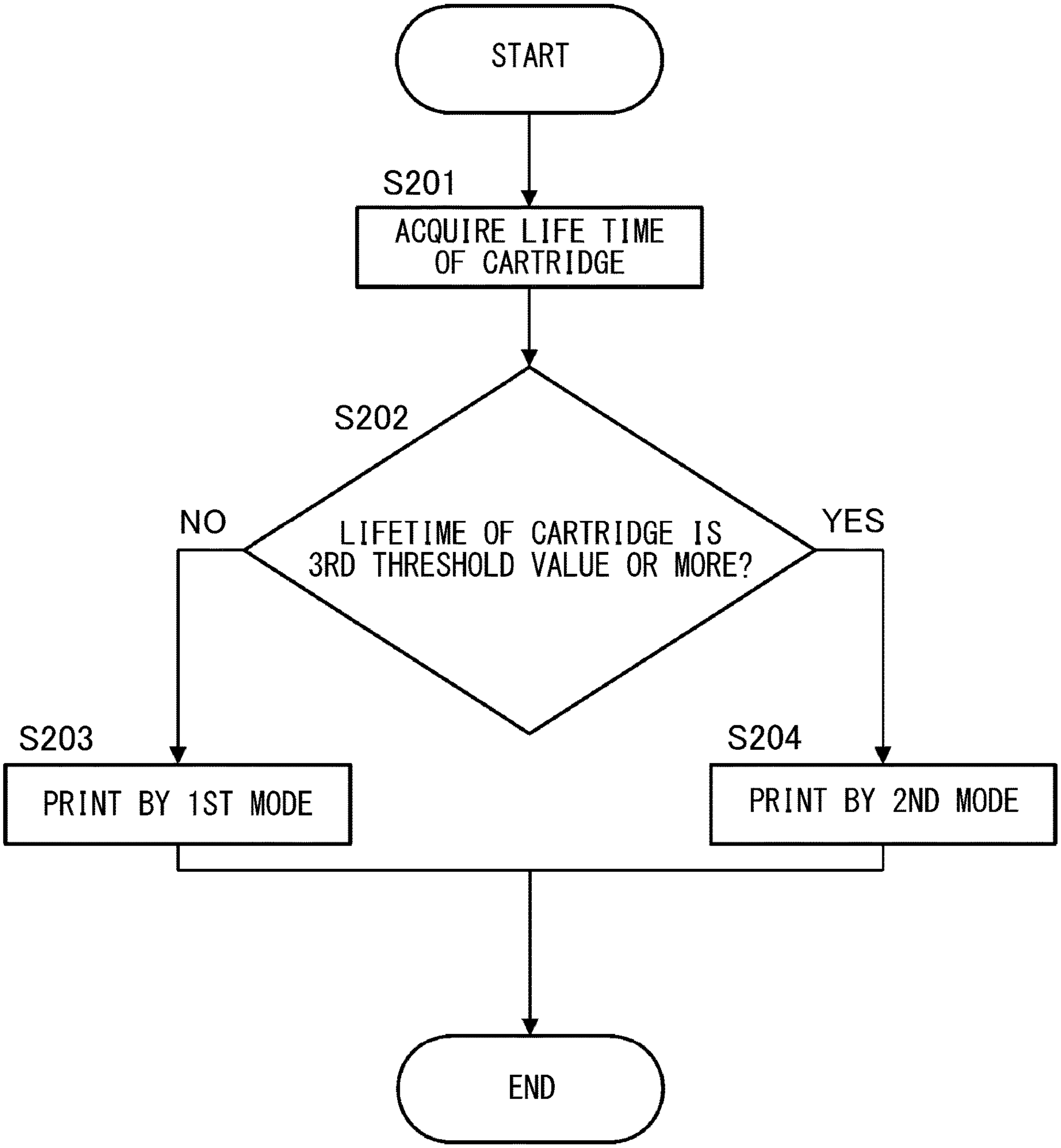
FIG. 7 is a flowchart showing a mode switching control in the embodiment 4.

FIG. 7 is a flowchart showing a process to switch a first mode and a second mode according to the cartridge lifetime. The first mode and the second mode are the same as the embodiment 1. In S201 the control unit 200 acquires the cartridge lifetime memorized in the memorizing unit (for example, the RAM 200*c*) for the cartridge lifetime in an image forming apparatus 100. In S202 the control unit 200 determines whether the cartridge lifetime is a third threshold value (for example, 60%) or larger. A process is proceeded to S203 when the control unit 200 determines that the cartridge lifetime is less than the third threshold value and the process is proceeded to S204 when the control unit 200 determines that the cartridge lifetime is the third threshold value or larger.

In S203 the control unit selects the first mode, executes printing in the first mode, and then ends the process. In S204 the control unit selects a second mode, executes printing in the second mode, and then ends the process. Note that, it is not limited to the third threshold value 60% by which the cartridge lifetime is determined in the embodiment 4. The third threshold value may be adjusted by a toner property, a resistance of an intermediate transfer belt, a primary transfer charge, a cartridge structure, or a circumstance, etc.

[Effect]

A comparative example 1 and the embodiment 4 will be described with Table 8. The comparative example is as described above.

TABLE 8

| | Comparative example 1 | Embodiment 4 |
|---|---|---|
| Abnormal discharged image | Δ | ○ |
| Cartridge durability | ○ | ○ |
| Automatic mode switching | — (not compatible) | ○ (compatible) |

○: Excellent
Δ: OK

Table 8 shows an occurring situation of the abnormal discharged image and a cartridge durability in the comparative example 1 and the embodiment 4 with (○(excellent)) and (Δ(OK)). Also, an automatic switching mode is shown with compatible (○), and not compatible (—).

The embodiment 4 shows a case that both the first mode and the second mode are provided and switched automatically according to the cartridge lifetime by controlling as described above. In the embodiment 4 it is possible to decrease a chance of the abnormal discharge by printing in the second mode automatically in a case an almost new cartridge P that the abnormal discharge may occur is used. Note that, the controlling in the embodiment 3 which switches mode according to the area or shape of the image formed and the controlling in the embodiment 4 may be combined.

As described above, the control unit 200 switches the first mode and the second mode according to information about the lifetime of the cartridge P. The information about the cartridge lifetime is expressed with a value which is larger when the cartridge P is newer than the older cartridge P. The control unit 200 executes an image forming in the first mode when the information relates the lifetime of the cartridge P is less than the third threshold value and executes the image forming in the second mode when the value of the cartridge lifetime is the threshold value or larger. The control unit 200 requires the information of the lifetime of the cartridge P based on the detecting results of the detecting portion 90 detecting the number of rotations of the developing roller 3.

Based on above, according to the embodiment 4, a configuration that allows the selection of a mode which prioritizes the cartridge durability or a mode which suppresses the abnormal discharge occurring in the upstream side from the primary transfer portion in the rotational direction of the photosensitive drum 1 can be offered.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-204608 filed on Dec. 16, 2021, which is hereby incorporated by reference herein in its entirety.

What is claimed is:

1. An image forming apparatus comprising:

a rotatable image bearing member configured to bear a toner image;

an exposure unit configured to form an electrostatic latent image on a surface of the image bearing member by exposing the surface of the image bearing member;

a rotatable developing member configured to develop the electrostatic latent image with a developer;

a voltage applying unit capable of forming a developing potential on the developing member by applying a developing voltage to the developing member;

a driving unit configured to rotationally drive the developing member; and a control unit capable of selectively executing an operation in a first mode and in a second mode by controlling a circumferential speed ratio of a circumferential speed of the developing member to a circumferential speed of the image bearing member and a potential difference between the developing potential and a surface potential of the image bearing member in a region where the electrostatic latent image is formed by the exposure unit, wherein the first mode is a mode in which the circumferential speed ratio is a first circumferential speed ratio larger than 50% and less than 100% and the potential difference is a first potential difference, and wherein the second mode is a mode in which the circumferential speed ratio is a second circumferential speed ratio larger than the first circumferential speed ratio and less than 150% and the potential difference is a second potential difference less than the first potential difference.

2. The image forming apparatus according to claim 1, wherein the developing member includes a roller portion contacting the image bearing member and a surface roughness Rz of the roller portion thereof is 8.0 μm to 15.0 μm.

3. The image forming apparatus according to claim 1, wherein a weight per unit area of the developer applied to the image bearing member in the first mode is equal to a weight per unit area of the developer applied to the image bearing member in the second mode.

4. The image forming apparatus according to claim 1, wherein the control unit is capable of executing the operation in a third mode, the third mode being a mode in which the circumferential speed ratio is a third circumferential speed ratio larger than the first circumferential speed ratio and the potential difference is a third potential difference larger than the first potential difference, and wherein a weight per unit area of the developer applied to the image bearing member in the third mode is more than the weight per unit area of the developer applied to the image bearing member in the first mode and in the second mode.

5. The image forming apparatus according to claim 1, wherein the control unit is capable of selectively executing the operation in the first mode or in the second mode according to an image data of an image to be formed on a recording material.

6. The image forming apparatus according to claim 5, wherein the control unit is capable of selectively executing the operation in the first mode or in the second mode according to an area of a region where a developer image formed on the image bearing member based on the information is continued.

7. The image forming apparatus according to claim 6, wherein the control unit executes the operation in the first mode in a case in which the area of the continued region is less than a first threshold value.

8. The image forming apparatus according to claim 6, wherein the control unit is capable of selectively executing the operation in the first mode or in the second mode according to a shape of the continued region.

9. The image forming apparatus according to claim 7, wherein the control unit executes the operation in the first mode in a case in which the area of the continued region is equal to or larger than the first threshold value and a distance between two points positioned farthest from each other in a shape of the continued region is longer than a second threshold value, and wherein the control unit executes the operation in the second mode in a case in which the area of the continued region is equal to or larger than the first threshold value and the distance is equal to or shorter than the second threshold value.

10. The image forming apparatus according to claim 1, further comprising a cartridge including the image bearing member and the developing member, wherein the control unit is capable of selectively executing the operation in the first mode or in the second mode according to information on a lifetime of the cartridge.

11. The image forming apparatus according to claim 10, wherein a value of the information when the cartridge is new is larger than when a use of the cartridge progresses, and wherein the control unit executes the operation in the first mode in a case in which the value of the information is less than a third threshold and executes the operation in the second mode in a case in which the value of the information is equal to or larger than the third threshold.

12. The image forming apparatus according to claim 10, further comprising a detecting unit configured to detect a number of rotations of the developing member, wherein the control unit acquires the information based on a detecting result of the detecting unit.

* * * * *